(12) United States Patent
Wilkerson et al.

(10) Patent No.: US 7,381,910 B1
(45) Date of Patent: Jun. 3, 2008

(54) SENSOR FRAME FOR GENERATING A WEIGHT SIGNAL OF A CURVED OBJECT

(75) Inventors: Jack Wilkerson, Eustis, FL (US); Curt Wyatt, Corona, CA (US); John Biggie, Lighthouse Point, FL (US)

(73) Assignee: Anodyne Medical Devices, LLC, Los Angeles, CA (US)

( * ) Notice: Subject to any disclaimer, the term of this patent is extended or adjusted under 35 U.S.C. 154(b) by 0 days.

(21) Appl. No.: 11/735,071

(22) Filed: Apr. 13, 2007

(51) Int. Cl.
*G01G 21/28* (2006.01)
*G01G 23/00* (2006.01)

(52) U.S. Cl. .................. 177/144; 177/161; 177/253

(58) Field of Classification Search ............. 177/144, 177/161, 211, 253
See application file for complete search history.

(56) References Cited

U.S. PATENT DOCUMENTS

| | | |
|---|---|---|
| 3,961,675 A | 6/1976 | Siegel |
| 4,015,677 A | 4/1977 | Silva et al. |
| 4,177,868 A | 12/1979 | Sanders et al. |
| 4,281,730 A | 8/1981 | Swersey et al. |
| 4,363,368 A | 12/1982 | Paddon et al. |
| 4,551,882 A | 11/1985 | Swersey et al. |
| 4,807,558 A | 2/1989 | Swersey |
| 4,974,692 A | 12/1990 | Carruth et al. |
| 4,979,580 A | 12/1990 | Lockery |
| 5,086,856 A | 2/1992 | Haggstrom |
| 5,173,977 A | 12/1992 | Carruth et al. |
| 5,747,745 A | 5/1998 | Neuman |
| 5,831,221 A | 11/1998 | Geringer et al. |
| 5,861,582 A | 1/1999 | Flanagan et al. |
| 6,380,496 B1 | 4/2002 | Lohkamp |
| 6,518,520 B2 | 2/2003 | Jones et al. |
| 6,639,157 B2 | 10/2003 | Sternberg et al. |
| 6,680,442 B1 | 1/2004 | Rynd et al. |
| 6,717,072 B1 | 4/2004 | Winterberg et al. |
| 6,765,154 B2 | 7/2004 | Sternberg |
| 6,924,441 B1 | 8/2005 | Mobley et al. |

FOREIGN PATENT DOCUMENTS

DE 7225247 10/1973

*Primary Examiner*—Randy W Gibson
(74) *Attorney, Agent, or Firm*—Nixon & Vanderhye P.C.

(57) ABSTRACT

A bed scale system includes at least one sensor frame having structure for generating a weight signal of a curved object such as a supporting wheel on a hospital bed or the like. The sensor frame includes a pair of spaced sidewalls defining a receiving area for the curved object, a bottom surface connected between the spaced sidewalls, and a deflection tab cooperable with the bottom surface. The deflection tab is deflected relative to the spaced sidewalls upon an application of weight to the sidewalls. A strain gauge is secured to the deflection tab and outputs a weight signal corresponding to the weight of the curved object according to a deflection amount of the deflection tab. The economical system provides patient weight without requiring removal of the patient from bed.

7 Claims, 3 Drawing Sheets

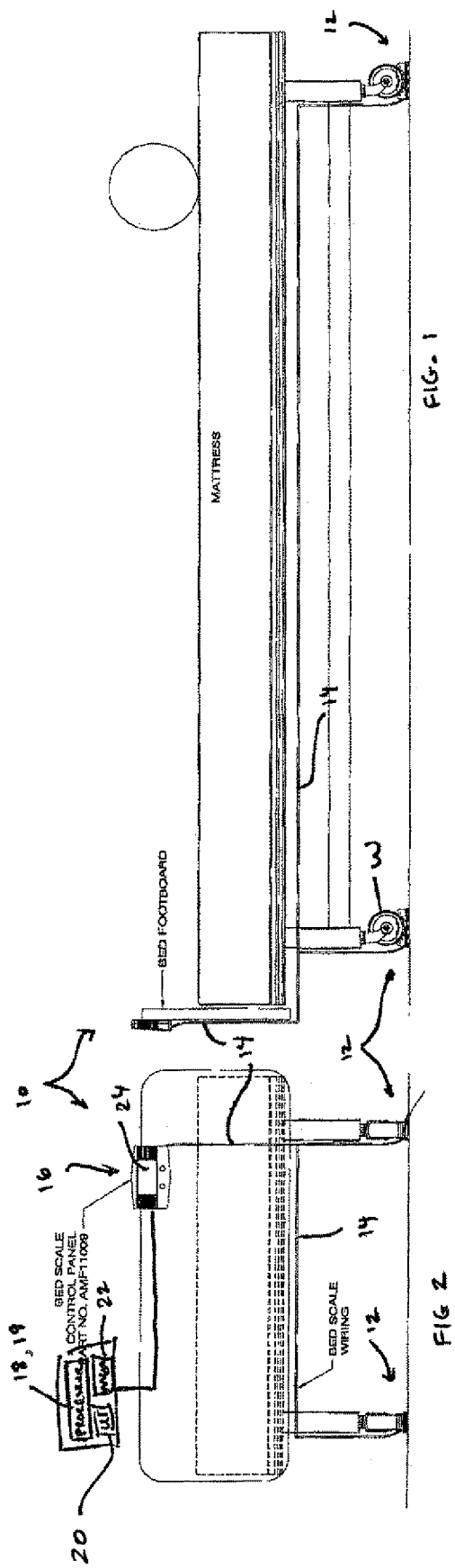
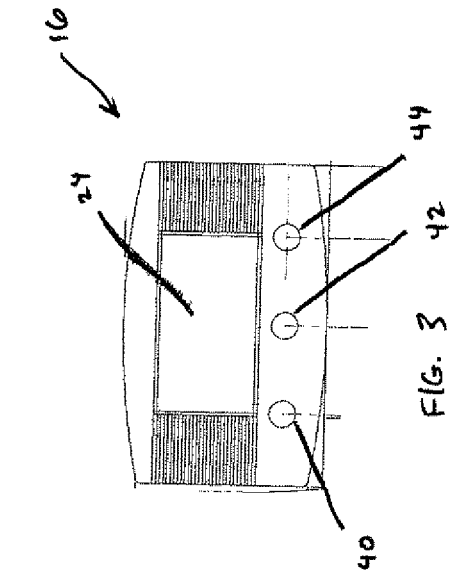
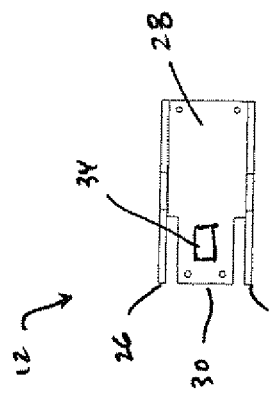

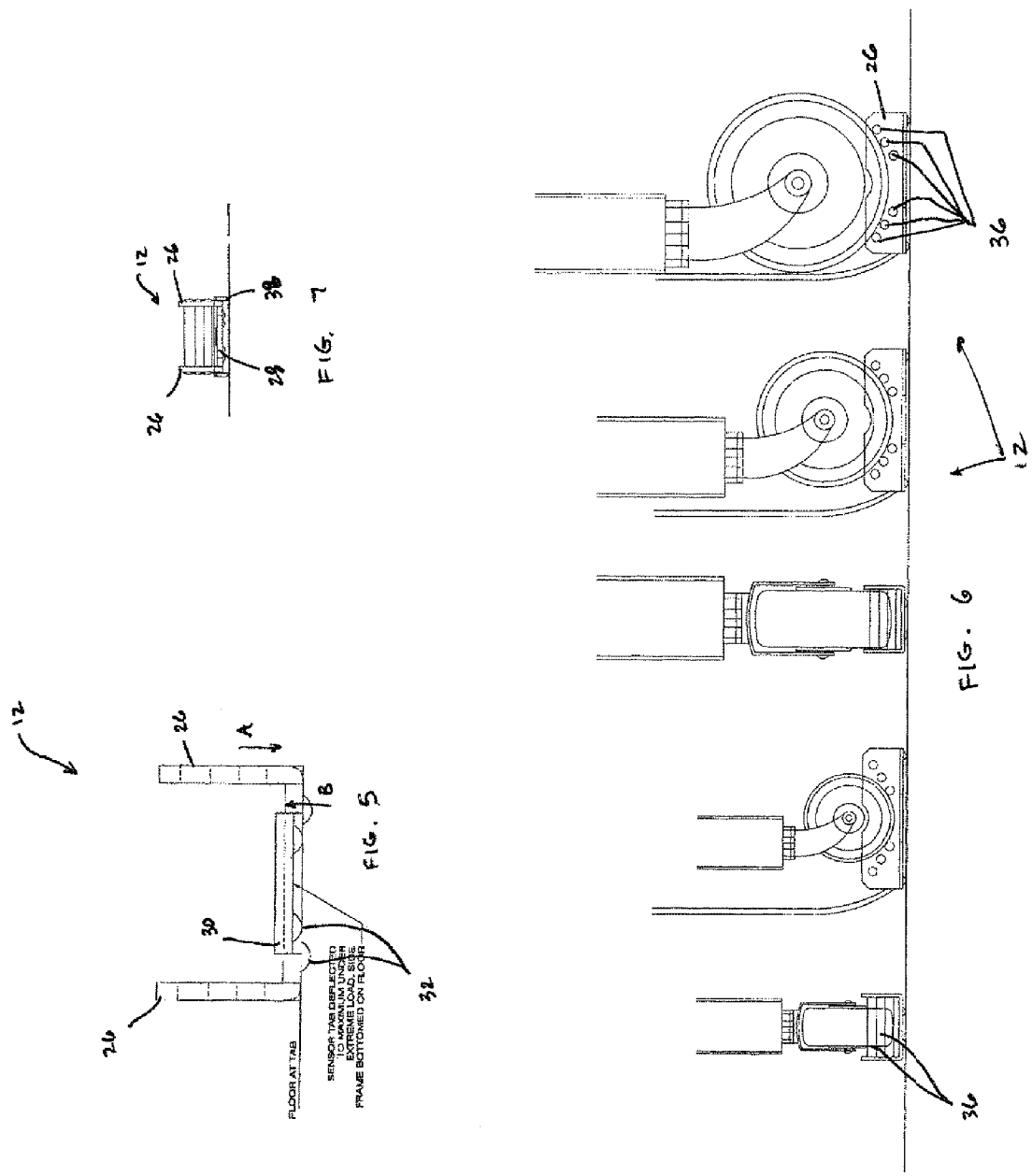

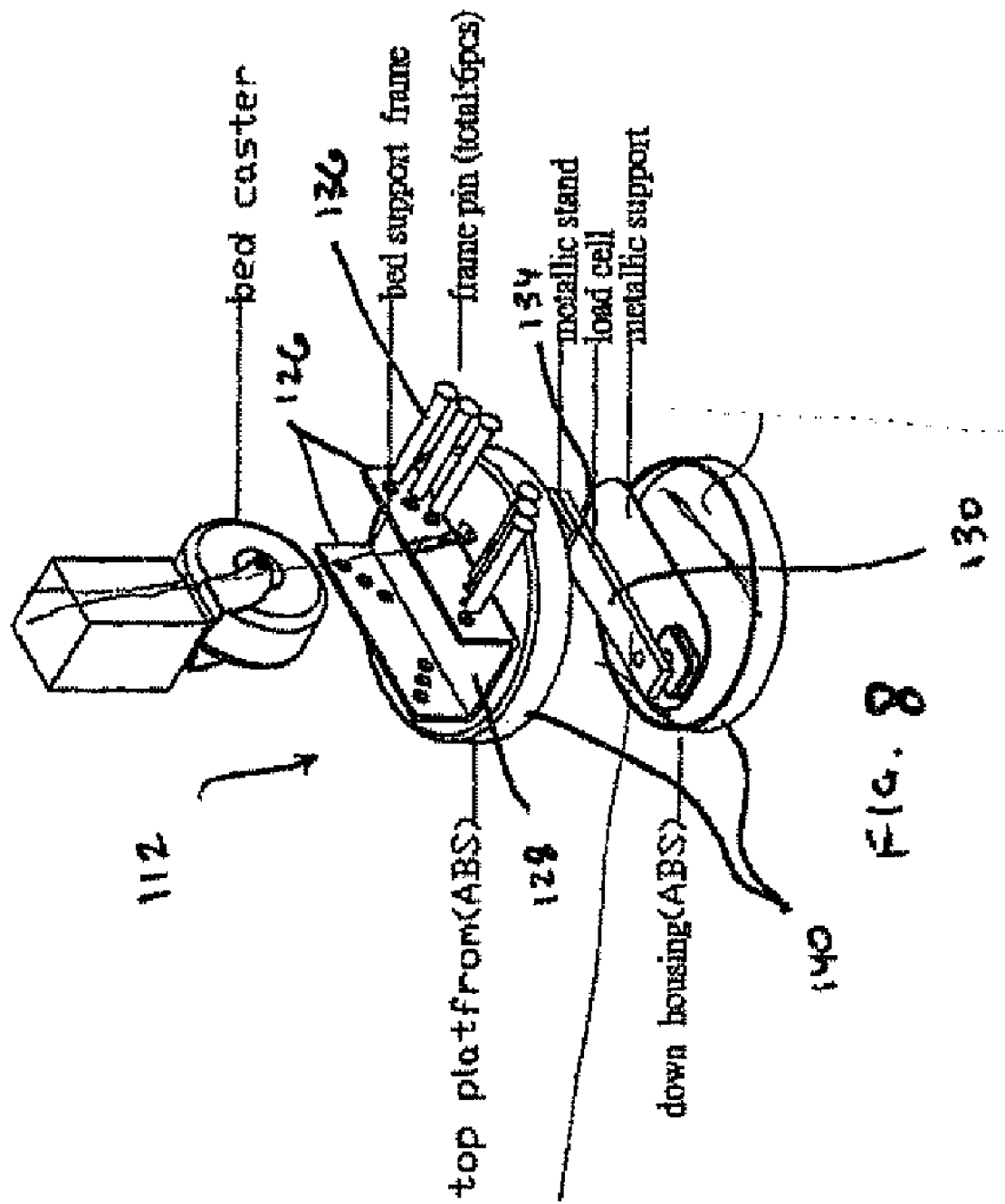

SENSOR FRAME FOR GENERATING A WEIGHT SIGNAL OF A CURVED OBJECT

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

The invention relates to an accessory bed scale system and, more particularly, to a bed scale system that provides for accurate patient weighing without requiring a patient to be moved out of the bed.

Hospitals, certified nursing homes (or skilled nursing facilities), and the like use patient weight changes to monitor current medical condition and treatment progress. Additionally, Medicare requires certified nursing homes to weigh patients daily to detect dehydration, disease, and malnutrition. Typically, in order to weigh a patient, the patient must be taken out of bed and transported to a weighing scale. Every hospital and/or nursing home, etc., however, has patients too ill for removal from bed. Another category of patients includes those unsteady on their feet for which a daily weighing procedure runs the risk of falls and broken bones.

Bed scale systems and accessory bed scales exist on the market that purport to address this problem, but typically are too costly for the facilities to purchase. Current bed scale systems are engineered for heavy duty class 3 certification for absolute patient weight accuracy. Such prior art design and construction details lead to costs that are 10 times the amount that nursing homes can afford to devote to individual patients. It would be desirable to develop a cost effective design to monitor patient weight changes at a cost that will enable purchase for every needy patient. It would further be desirable to provide a design that meets this need and utilizes a minimum of parts and manufacturing costs to deliver a scale that accurately tracks patient weight changes from day to day.

BRIEF SUMMARY OF THE INVENTION

A system for weighing patients in a hospital bed or the like includes a plurality of sensor frames that install under the wheel casters of a bed frame, respectively. The sensor frames each include a strain gauge or load cell mounted on a deflection tab supported in the sensor frame or on a separate sensor beam under the frame. The sensor frames measure the weight on each wheel via the strain gauges or load cells. A set of spaced support surfaces such as load pins or the like are positioned in the sensor frame in generally a V-shape to positively align the center line of the wheel casters with a sensor load center line regardless of a caster size. This automatic alignment with installation removes typical sensor loading errors.

In an exemplary embodiment of the invention, a sensor frame includes structure for generating a weight signal of a curved object. The sensor frame includes a pair of spaced sidewalls defining a receiving area for the curved object, a bottom surface connected between the spaced sidewalls, and a deflection tab cooperable with the bottom surface. The deflection tab is deflected relative to the spaced sidewalls upon an application of weight to the sidewalls. A strain gauge is secured to the deflection tab and outputs a weight signal corresponding to the weight of the curved object according to a deflection amount of the deflection tab. The sensor frame may additionally include support structure cooperable with the spaced sidewalls that supports the curved object in line with a load centerline regardless of a size of the curved object. In one preferred embodiment, the support structure includes pin supports affixed between the spaced sidewalls. In this context, the pin supports are arranged in a substantially V-shape across a length of the sidewalls.

The deflection tab may be integral with the bottom surface. Generally, the spaced sidewalls and the bottom surface define a substantially U-shape channel.

The sensor frame may still additionally include contact protrusions disposed on an underside of the deflection tab and on an underside of the bottom surface. In this context, with the deflection tab coupled with a forward end of the bottom surface, the contact protrusions on the underside of the bottom surface are disposed on a rearward end of the bottom surface.

A carpet cup may be provided that is attachable to an underside of the spaced sidewalls and the bottom surface.

In another exemplary embodiment of the invention, a weighing system for weighing an object supported on at least one wheel includes at least one of the sensor frames described herein, one each for each wheel, and a signal processor communicating with the strain gauge of each sensor frame. The signal processor processes the weight signal from each sensor frame and outputs a weight of the object. The system may additionally include a control panel communicating with the signal processor. The control panel has a first button for activating a tare function, a second button for activating a weigh function, and a display. In one arrangement, the object is a bed supported on four wheels, and the system thereby includes four sensor frames.

The weighing system may define a kit including a plurality of sensor frames. In this context, the signal processor combines the weight signals from all active sensor frames to determine a weight of the object.

In yet another exemplary embodiment of the invention, a sensor frame for generating a weight signal of a curved object includes a pair of spaced sidewalls defining a receiving area for the curved object, a bottom surface connected between the spaced sidewalls, and a deflection member cooperable with the bottom surface. The deflection member is deflected upon an application of weight to the sidewalls. A strain gauge is secured to the deflection member and outputs a weight signal corresponding to the weight of the curved object according to a deflection amount of the deflection member. In one embodiment, the strain gauge is disposed within a housing on which the sidewalls and bottom surface are supported.

BRIEF DESCRIPTION OF THE DRAWINGS

These and other aspects and advantages of the present invention will be described in detail with reference to the accompanying drawings, in which:

FIG. 1 is a side view of a bed scale system in use;

FIG. 2 is an end view thereof;

FIG. 3 is a close-up view of an exemplary control panel;

FIG. 4 is a plan view of one sensor frame forming part of the bed scale system;

FIG. 5 is an end view of a sensor frame;

FIG. 6 shows various views illustrating the manner in which different sized casters are accommodated in the sensor frame;

FIG. 7 is an end view of the sensor frame showing a floor carpet cup; and

FIG. 8 illustrates an alternative embodiment.

DETAILED DESCRIPTION OF THE INVENTION

FIGS. 1 and 2 show a side view and an end view, respectively of the bed scale system 10 described herein. The system 10 includes a plurality of sensor frames 12, one for each wheel W or other bed support structure. The sensor frames 12 are connected via suitable wiring 14 to a control panel 16. The control panel 16 houses a signal processor 18, a microprocessor 19, a user interface 20 including buttons and the like on the control panel, and a memory 22. The control panel 16 also includes a display 24.

FIGS. 4 and 5 show plan and end views, respectively, of the sensor frame 12. Each sensor frame 12 includes a pair of spaced sidewalls 26 defining a receiving area for the wheel or other curved object W. A bottom surface 28 is connected between the spaced sidewalls 26. The spaced sidewalls 26 and the bottom surface 28 define a substantially U-shape channel.

A deflection tab 30 is cooperable with the bottom surface 28, preferably integral with the bottom surface 28, and is separated from the sidewalls 26 as shown in FIG. 4 so that the deflection tab 30 is deflected relative to the spaced sidewalls 26 upon an application of a load (weight) to the sidewalls 26. That is, as a weight or load is applied to the sidewalls 26 in the direction of arrow A in FIG. 5, since the deflection tab 30 is separated from the sidewalls 26, the deflection tab 30 is caused to deflect in the direction of arrow B in FIG. 5. To facilitate and control the amount of deflection, a plurality of contact protrusions 32 are disposed on an underside of the deflection tab 30 and on an underside of the bottom surface 28. With the deflection tab 30 coupled with a forward end of the bottom surface 28, the contact protrusions on the underside of the bottom surface are disposed on a rearward end of the bottom surface 28, and the contact protrusions 32 on the deflection tab 30 are disposed generally on a forward end of the deflection tab 30 as shown in FIG. 4. The contact protrusions are preferably located a precision distance from the load centerline to provide a uniform calibrated reference dimension by design.

A strain gauge or load cell 34 is affixed to the deflection tab 30. The strain gauge 34 outputs a weight signal corresponding to the weight of the wheel or the like according to a deflection amount of the deflection tab 30. As the deflection tab is deflected in the direction of arrow B in FIG. 5 relative to the sidewalls 26, the strain gauge 34 outputs the linear relationship of the deflection. In this manner, the strain gauge 34 outputs a signal that corresponds to the weight of the bed wheel or other support. Strain gauges used for this application are typically custom made and bonded to the deflection tab 30 for uniform calibration purposes at the manufacturer.

With reference to FIG. 6, each sensor frame 12 is provided with support structure such as pins 36 or the like fixed across the spaced sidewalls 26. The support structure 36 supports the wheel or other curved object W in line with a load center line, regardless of the size of the curved object. With the load in line with the load center line, an accurate weight measurement can be computed by the control panel 16 signal processor 18 and onboard microprocessor 19. In a preferred construction, the pin supports 36 are affixed between the spaced sidewalls 26 and arranged in a substantially V-shape across a length of the sidewalls 26. In this manner, as shown in FIG. 6, various size wheels may be accommodated in the sensor frame 12 with a load center line properly aligned for accurate measurement regardless of a size of the wheel.

With reference to FIG. 7, each of the sensor frames 12 may additionally include a carpet cup 38 attachable to an underside of the spaced sidewalls 26 and bottom surface 28. The carpet cup 36 provides support for the sensor frame 12 when used on a carpeted floor. Preferably, the carpet cup 36 is indexed to the assembly so that if the bed frame is pushed across the floor, the carpet cup 36 will slide in alignment with the sensor frames 12.

In use, the system must first determine a tare reading (i.e., a basis weight of the bed and its contents without the patient). With reference to FIG. 3, one of the control panel buttons 40 marked TARE is depressed when the bed is empty, and the system registers the tare reading by retrieving and processing signals from each of the frame sensors. The tare reading may be displayed on the display. With a patient resident in the bed, another control panel button 42 marked WEIGH is depressed, and the system calculates and displays a patient weight based on the weight/load signals from the frame sensors less the tare weight stored in memory during the last tare input. For convenience, the system memory may store and display prior weight readings. Pressing the control panel button 44 marked MEMORY will recall past weight measurements to enable medical personnel to check the trend of daily patient weight changes. The manner in which the strain gauges generate the weight signal and the processing of the signals into the patient weight are known, and details thereof will not be further described.

FIG. 8 illustrates an alternative embodiment of the sensor frame. Like the sensor frame 12 of the first embodiment, the sensor frame 112 shown in FIG. 8 includes spaced sidewalls 126 defining a receiving area for the wheel or other curved object, and a bottom surface 128 connected between the spaced sidewalls 126. A modified deflection member 130 supporting a strain gauge 134 is cooperable with the bottom surface 128 and disposed within a two-part housing 140.

When a load is supported via the support structure pins 136, the deflection member 130 is correspondingly deflected. The strain gauge 134 outputs a weight signal corresponding to the weight of the object according to a deflection amount of the deflection member 130. By supporting the strain gauge within a housing 140, the strain gauge 134 can be shielded to prevent floor detergents and the like and mechanical damage from affecting the gauge.

With the bed scale system described herein, a bedridden patient can be easily weighed without disturbing the patient or requiring the patient to get out of bed. The system uses economically constructed sensor frames to provide a load sensing point at each support point on the bed, and a microprocessor processes the weight signals to determine the patient weight after summing the total weight of all four sensors.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A sensor frame for generating a weight signal of a curved object, the sensor frame comprising:
   a pair of spaced sidewalls defining a receiving area for the curved object;
   a bottom surface connected between the spaced sidewalls;
   a deflection tab cooperable with the bottom surface, the deflection tab being deflected relative to the spaced sidewalls upon an application of weight to the sidewalls;
   a strain gauge secured to the deflection tab, the strain gauge outputting a weight signal corresponding to the weight of the curved object according to a deflection amount of the deflection tab; and
   support structure cooperable with the spaced sidewalls, the support structure supporting the curved object in line with a load centerline regardless of a size of the curved object, wherein the support structure comprises pin supports affixed between the spaced sidewalls, the pin supports being arranged in a substantially V-shape across a length of the sidewalls.

2. A sensor frame according to claim 1, wherein the deflection tab is integral with the bottom surface.

3. A sensor frame according to claim 1, wherein the spaced sidewalls and the bottom surface define a substantially U-shape channel.

4. A sensor frame according to claim 1, further comprising contact protrusions disposed on an underside of the deflection tab and on an underside of the bottom surface.

5. A sensor frame according to claim 4, wherein the deflection tab is coupled with a forward end of the bottom surface, and wherein the contact protrusions on the underside of the bottom surface are disposed on a rearward end of the bottom surface.

6. A sensor frame according to claim 1, further comprising a carpet cup attachable to an underside of the spaced sidewalls and the bottom surface.

7. A sensor frame for generating a weight signal of a curved object, the sensor frame comprising:
   a pair of spaced sidewalls defining a receiving area for the curved object;
   a bottom surface connected between the spaced sidewalls;
   a deflection member cooperable with the bottom surface, the deflection member being deflected upon an application of weight to the sidewalls;
   a strain gauge secured to the deflection member, the strain gauge outputting a weight signal corresponding to the weight of the curved object according to a deflection amount of the deflection member wherein the strain gauge is disposed within a housing on which the sidewalls and bottom surface are supported; and
   support structure cooperable with the spaced sidewalls, the support structure supporting the curved object in line with a load centerline regardless of a size of the curved object, wherein the support structure comprises pin supports affixed between the spaced sidewalls, the pin supports being arranged in a substantially V-shape across a length of the sidewalls.

* * * * *